United States Patent
Kugelmann

(10) Patent No.: US 6,540,503 B1
(45) Date of Patent: Apr. 1, 2003

(54) DEVICE FOR PRODUCING GROUND MEAT PATTIES OF BEEF AND/OR PORK

(75) Inventor: Johan Kugelmann, Welden (DE)

(73) Assignee: OSI International, Inc., Aurora, IL (US)

( * ) Notice: Subject to any disclaimer, the term of this patent is extended or adjusted under 35 U.S.C. 154(b) by 0 days.

(21) Appl. No.: 09/593,466

(22) Filed: Jun. 14, 2000

(30) Foreign Application Priority Data

Dec. 9, 1999 (DE) .......................... 199 59 432

(51) Int. Cl.⁷ ............................................. B29C 45/77
(52) U.S. Cl. ....................... 425/556; 425/572; 425/575; 425/812
(58) Field of Search .............................. 425/236, 436 R, 425/556, 572, 574, 588, 575, 812

(56) References Cited

U.S. PATENT DOCUMENTS

| | | | | |
|---|---|---|---|---|
| 3,191,232 A | * | 6/1965 | Haller | 425/78 |
| 3,731,345 A | * | 5/1973 | Brackman | 425/556 |
| 3,747,160 A | * | 7/1973 | Holly et al. | 425/556 |
| 3,869,757 A | * | 3/1975 | Holly | 425/556 |
| 3,887,964 A | * | 6/1975 | Richards | 425/556 |
| 4,097,961 A | * | 7/1978 | Richards | 425/556 |
| 4,118,831 A | * | 10/1978 | Holly et al. | 425/562 |
| 4,272,864 A | | 6/1981 | Holly | 426/513 |
| 4,338,702 A | * | 7/1982 | Holly | 425/556 |
| 4,987,643 A | | 1/1991 | Powers et al. | 425/139 |
| 5,725,891 A | * | 3/1998 | Reid, Jr. | 425/407 |

FOREIGN PATENT DOCUMENTS

| | | |
|---|---|---|
| DE | 196 27 661 | 1/1997 |
| GB | 2 212 096 A | 7/1989 |

* cited by examiner

Primary Examiner—Jan H. Silbaugh
Assistant Examiner—Emmanuel S. Luk
(74) Attorney, Agent, or Firm—Bell, Boyd & Lloyd LLC

(57) ABSTRACT

In order to increase the output, a device for producing ground meat patties of beef and/or pork comprises a shaping plate that can be moved out of a filling position in a shaping station into an ejecting position outside the shaping station, the shaping plate having holes that are disposed offset relative to each other in moving direction in two rows, one behind the other, a device by means of which the ground meat can be supplied under pressure via filling slots associated to each hole into the holes on the underside, said holes being covered at the top by means of a ventilation plate, an antilipbar serving to reduce the excess pressure that is disposed in the delivery area of the shaping station and having a continuous longitudinal slit and an ejection device disposed outside the shaping station above the ejecting position of the shaping plate having ejection cups whose quantity and position is coordinated with the holes 24 in the shaping plate.

17 Claims, 6 Drawing Sheets

DEVICE FOR PRODUCING GROUND MEAT PATTIES OF BEEF AND/OR PORK

DESCRIPTION

The invention relates to a device for producing ground meat patties of beef and/or pork.

BACKGROUND OF THE INVENTION

This type of device is already known in the art based on NL-A-9301248, the European patent EP 0 708 601 B1 and the European patent application EP 0 818 148 A1. The disadvantage found in these devices is that with the existing shaping plate having a maximum of six openings, the previous filling process and the system-related maximum number of 80 to 90 cycles per minute allows only a limited output of ground beef and/or pork patties. Accordingly, there is a need for further developing a device of the above mentioned type so as to permit a significant increase in the output.

SUMMARY OF THE INVENTION

The problem is solved in accordance with the invention by means of a device having the characteristic features of the patent claims.

Preferred characteristic features that advance the invention advantageously are also found in the patent claims.

Based on the design of the device according to the invention, an advantageous increase in the output of at least 33% is achieved even with the previous 80 cycles per minute and at least 50% with 90 cycles per minute. Of course, the device is also capable of operating at higher rates with respectively higher increases in the output up to a system-dependent limit.

The new shaping plate configuration having an uneven number of holes that are arranged offset in two rows, one behind the other, achieves a significant increase in capacity. Shaping plates having 7, 9 or 11 holes or having an even number of 8 or 10 holes are preferred. The arrangement is such that the number of holes in the row disposed in the direction of the shaping plate's ejecting position is lower by one than in the row behind or vice versa. The holes are "interlocked," so to speak, the distance between the front row and the rear row being smaller than the constant diameter of the holes. The holes in the front row are preferably disposed so as to be centrally offset relative to those in the rear row.

A further substantial measurement for the significant increase in the output is the configuration of a separate filling slot provided for each hole. The slot preferably has a right-angled cross section for shearing off the meat fiber whose lateral width is smaller than the width of the space between the holes of the adjacent row and whose length is smaller than the hole diameter. Said filling slots are disposed in a row and centrally adjusted to the holes and are preferably provided in a common receiver plate. With the above described filling slot arrangement, an ideal filling process is advantageously achieved in the filling position where the filling slots are covered by the holes when the shaping plate is moved out into the ejecting position.

The bar that serves to reduce the excess pressure is disposed in the output area of the shaping station and has a continuous longitudinal slit over its entire length. It is disposed below the front end and does not have grooves of a ventilation plate, which are disposed in the direction of the movement of the shaping plate. The ventilation plate itself is mounted stationary in the shaping station and has groove-shaped ventilation openings which run parallel to the shaping plate's moving direction and which are open on the side opposite the ejecting position.

The ground meat is preferably supplied via a distribution chamber provided below the receiver plate. The chamber can be filled with at least two alternately operating filling cylinders whose filling chamber is opened and closed by means of a rotary slide valve.

Other objects, features and advantages of the invention will be apparent from the following detailed disclosure, taken in conjunction with the accompanying sheets of drawings, wherein like numerals refer to like parts.

DETAILED DESCRIPTION OF THE INVENTION

Figure 1:
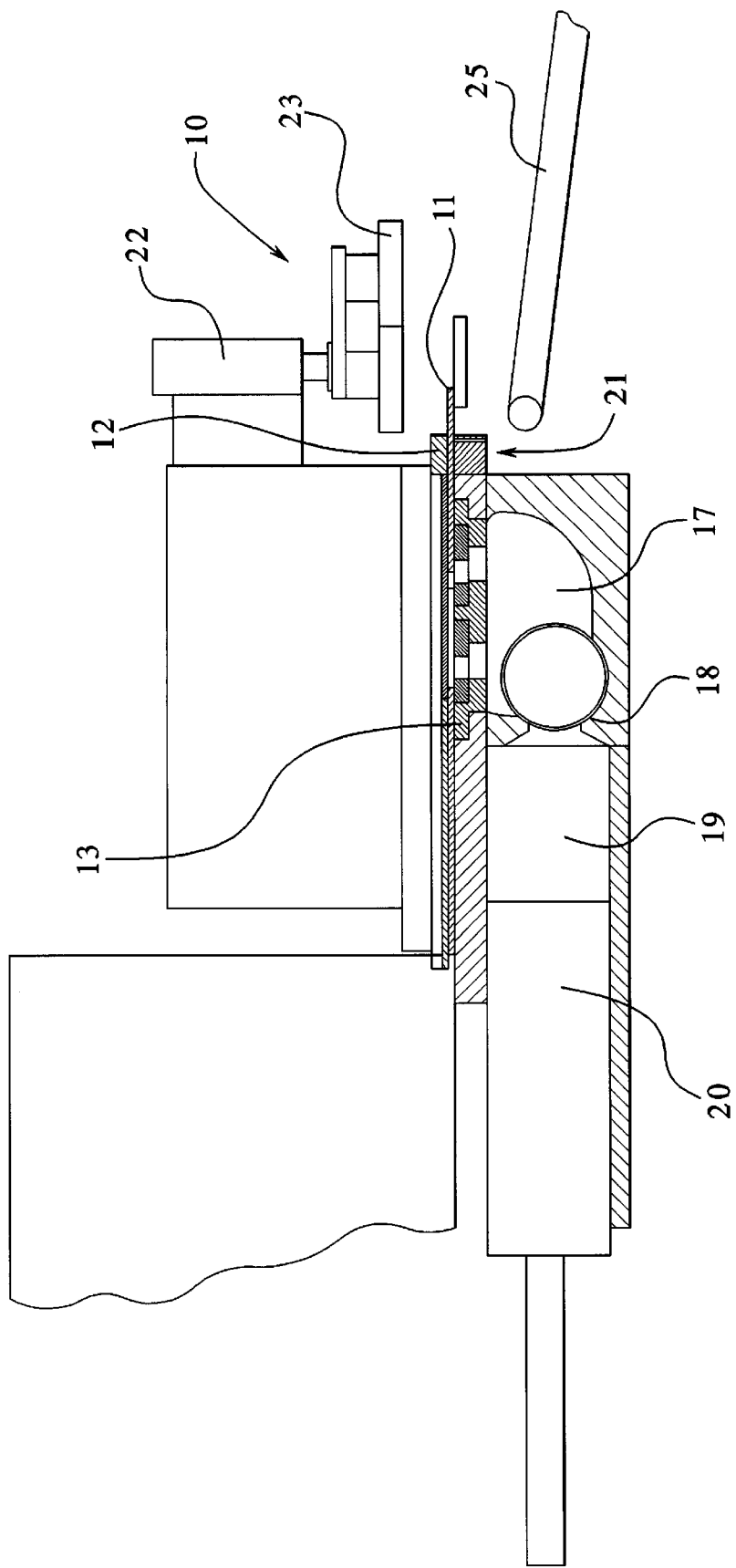
FIG. 1 is a schematic lateral profile through an exemplary embodiment of a device of the invention in the filling position.

FIG. 1 shows a schematic exemplary embodiment of a device 10 of the invention disposed is a shaping position. The device 10 comprises a shaping plate 11 shown in FIG. 1 in a filling position with respect to the shaping station and covered at the top by a ventilation plate 12. A receiver plate 13 is disposed below the shaping plate 11 (see FIGS. 2, 3, 6 and 7) where two inserts 14, 15 with rectangular shaped filling slots 16 are located.

The receiver plate 13 is disposed in a bottom plate in the shaping station.

Below the receiver plate 13 there is a distribution chamber 17 for the ground meat which can be connected with a filling chamber 19 via a rotary slide valve 18. The filling chamber 19 is provided between a filling cylinder 20 and the rotary slide valve 18.

Figure 6:
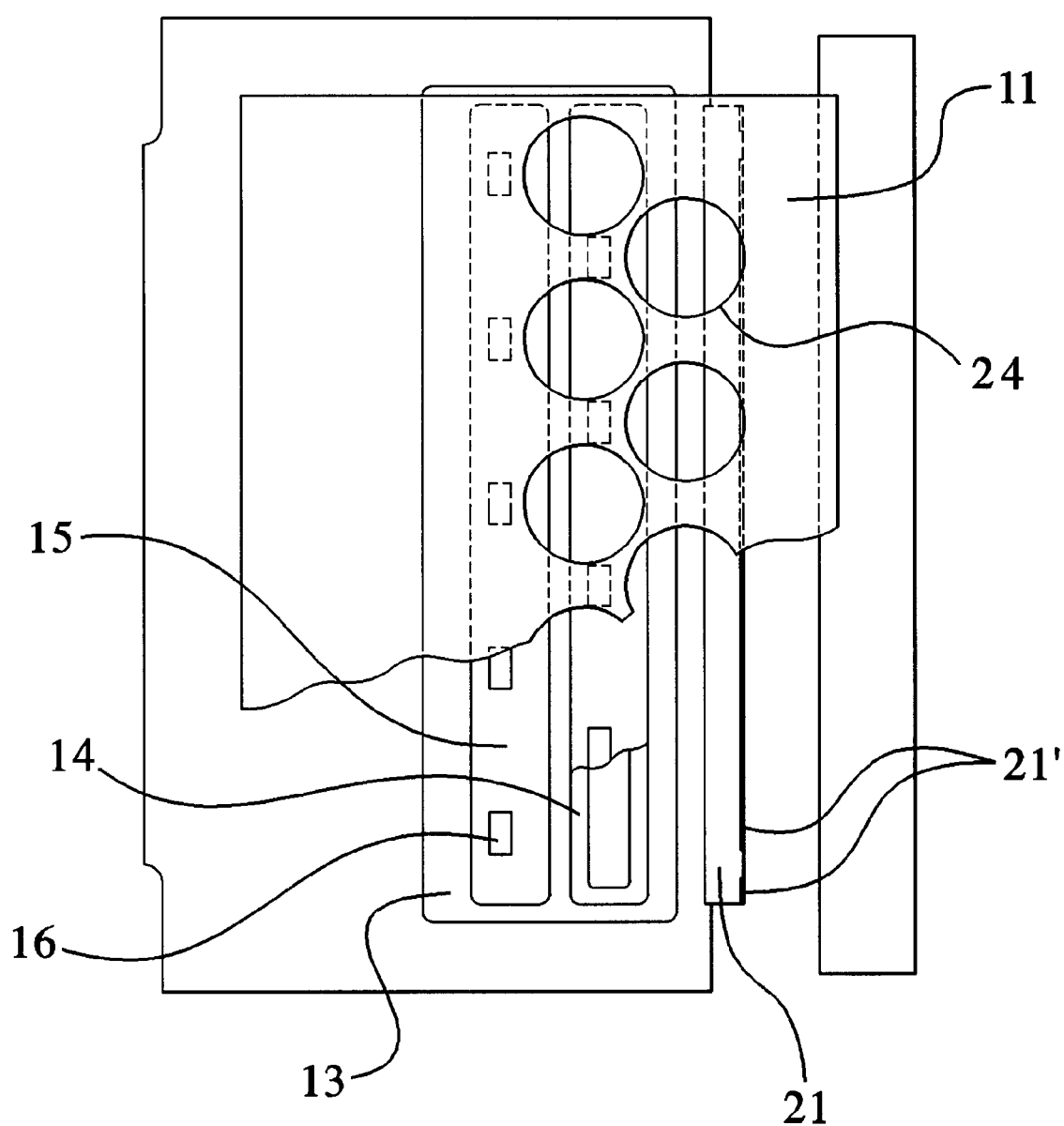
FIG. 6 is a schematic top view of the shaping plate moved out almost by half, where the rear half of the shaping plate has been cut off so as to show the receiver plate with the filling slots.

Reference 21 discloses a bar that serves to reduce the excess pressure in the rows of shaped ground meat patties and having a continuous longitudinal slit 21' (FIGS. 6 and 7) for ventilation towards the outside, see FIG. 6.

Figure 3:
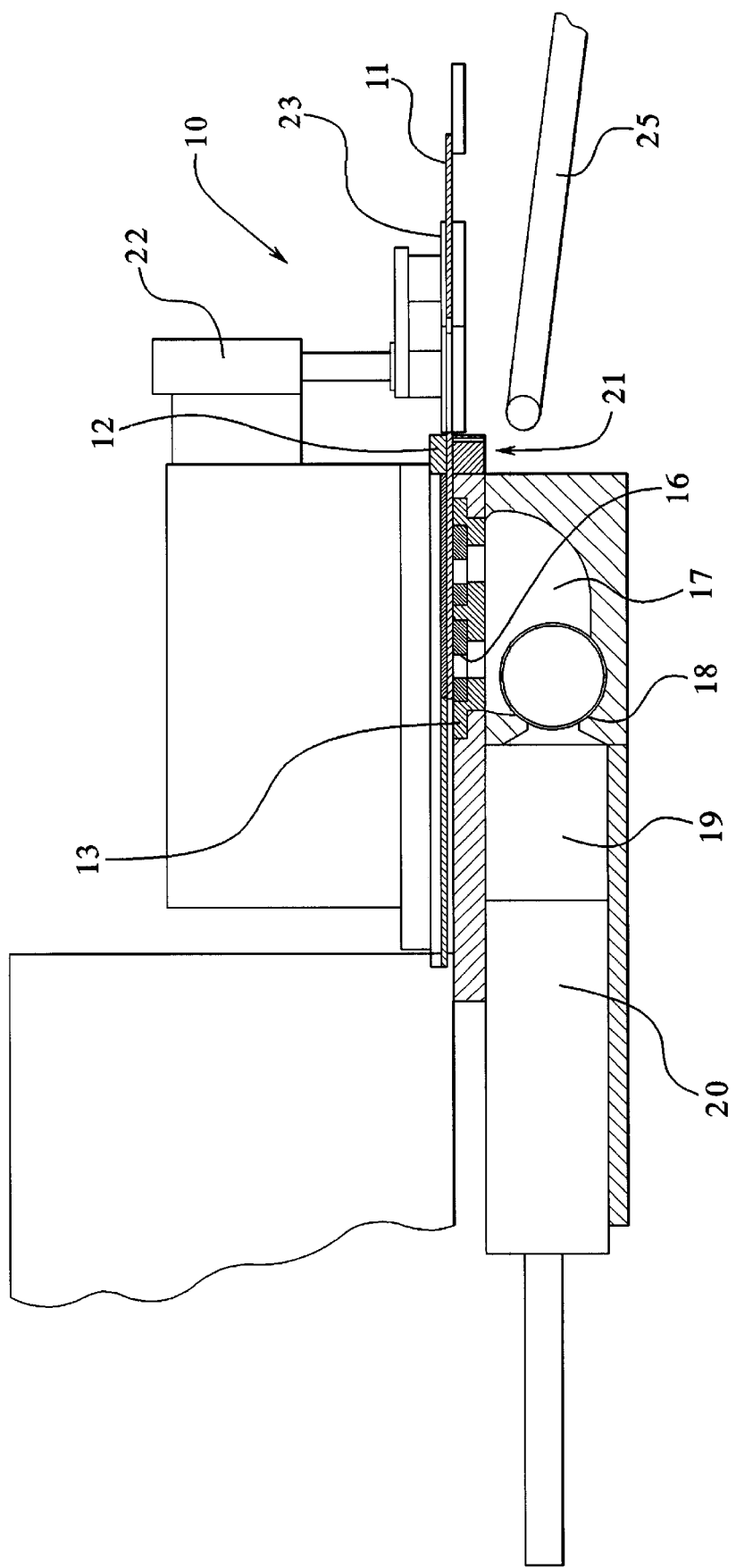
FIG. 3 is a view similar to FIG. 1 but where the shaping plate is in the ejecting position and the ejection device has already been activated.

Outside the shaping station 11, above a shaping plate 11 ejecting position, there is an ejection device 22 having ejection cups 23 whose position and quantity are coordinated with the holes 24 in the shaping plate 11. In FIG. 3, the ejection device 22 has already stamped the shaped ground meat patties from the holes 24 in the shaping plate 11 in its pulled out position. The ground meat patties are simultaneously ejected and carried away by means of a conveyor belt 25 disposed underneath.

Figure 2:
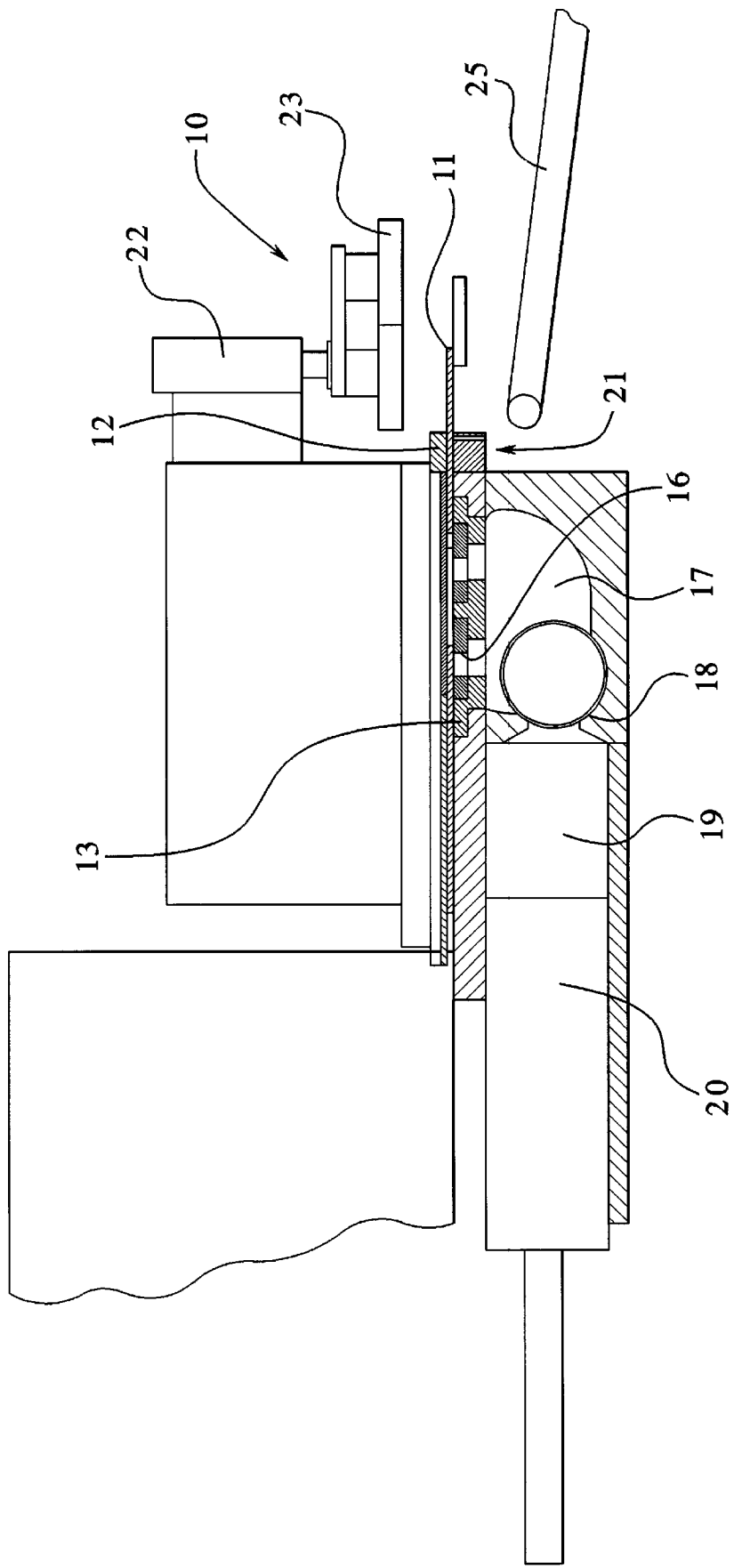
FIG. 2 is a view similar to FIG. 1 but where the shaping plate is already crossing the antilipbar so as to reduce the product pressure.

While FIG. 1 shows the shaping plate 11 in the filling position, FIG. 2 shows the shaping plate 11 in a more drawn out position where the pressure of the product, i.e. the ground meat patties, is reduced when the bar 21 is crossed. FIG. 3 shows the device 10 in the ejecting position. A fixed-cycle method of control is provided, but not shown, for moving the shaping plate 11 back and forth, the filling process and the ejection process and, if applicable, the delivery process.

Figure 4:
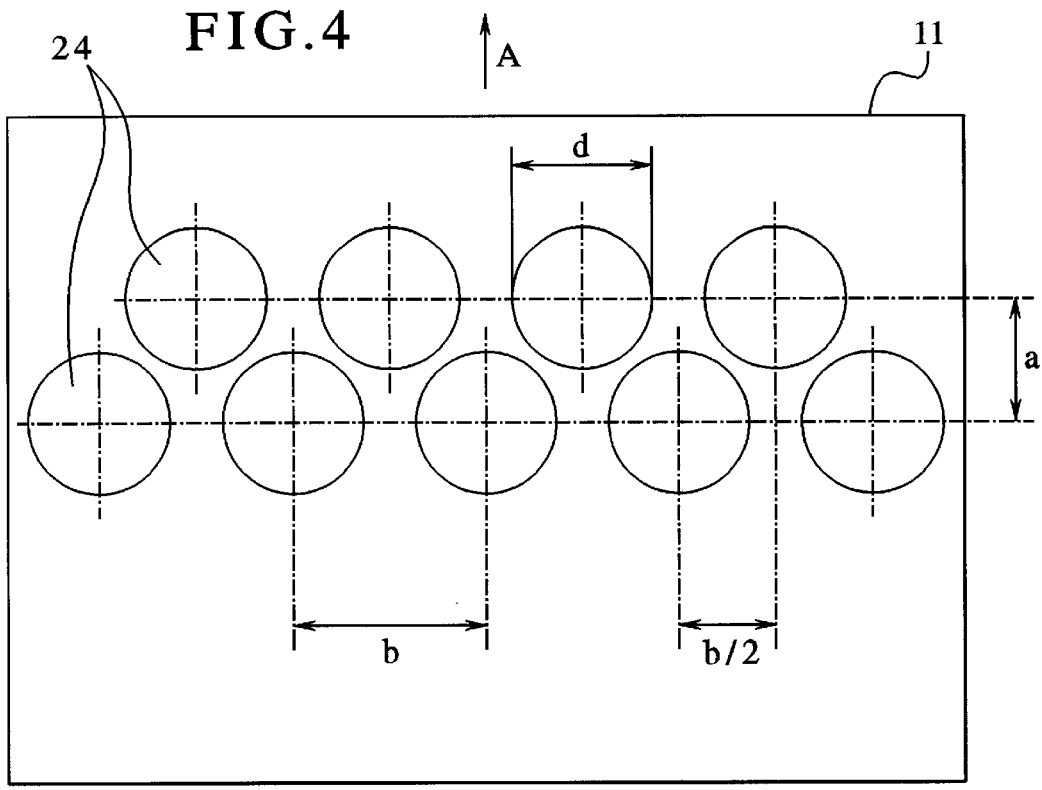
FIG. 4 is a top view of a shaping plate with nine holes.
Figure 5:
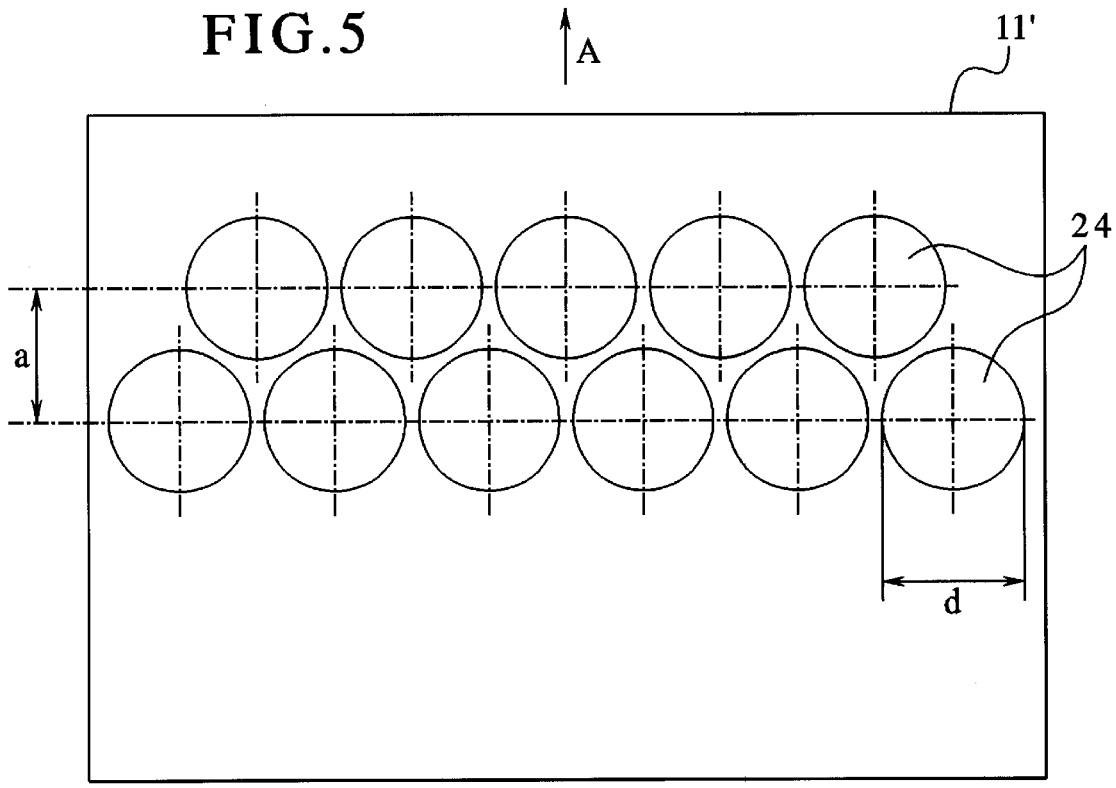
FIG. 5 is a top view of a shaping plate with eleven holes.

FIG. 4 shows a shaping plate 11 with a total of nine holes 24 while FIG. 5 shows a shaping plate 11' having eleven holes 24. The holes 24 in the shaping plates 11 and 11' respectively, are disposed in two parallel rows transverse to the moving direction A. As seen in moving direction, the number of holes in the front row is lower by one compared to the row behind. The holes 24 are disposed in rows "interlocked" in such a way that the holes in the front row (as seen in direction A) are centrally offset relative to those in the rear row. The distance "a" between the centers of the holes of the front and rear rows is smaller than the diameter "d" of the holes 24, which remains constant in all holes in the shaping plates 11 or 11', respectively.

The above mentioned offset between the holes is selected so as to offset the holes 24 in the front row with regard to the holes in the rear row by half of the hole center distance "b".

FIG. 6 shows a top view of a shaping plate 11 according to FIG. 4, which includes nine holes 24. The shaping plate has been moved out of the shaping station by approximately half of a total moveable distance, wherein the filling slots 16 are covered by the shaping plate 11 (part of plate 11 cut away for purposes of illustration) and holes 24 are just crossing the continuous longitudinal slit 21' in the pressure-reducing bar 21 so as to reduce the pressure.

Instead of the filling slots 16 having a configuration with a laterally oriented rectangular profile, said rectangular profile may also be oriented in longitudinal direction. This applies particularly when a shaping plate with eleven holes is used so as to adequately cover the holes by means of the spaces remaining between the rows of holes.

Figure 7:
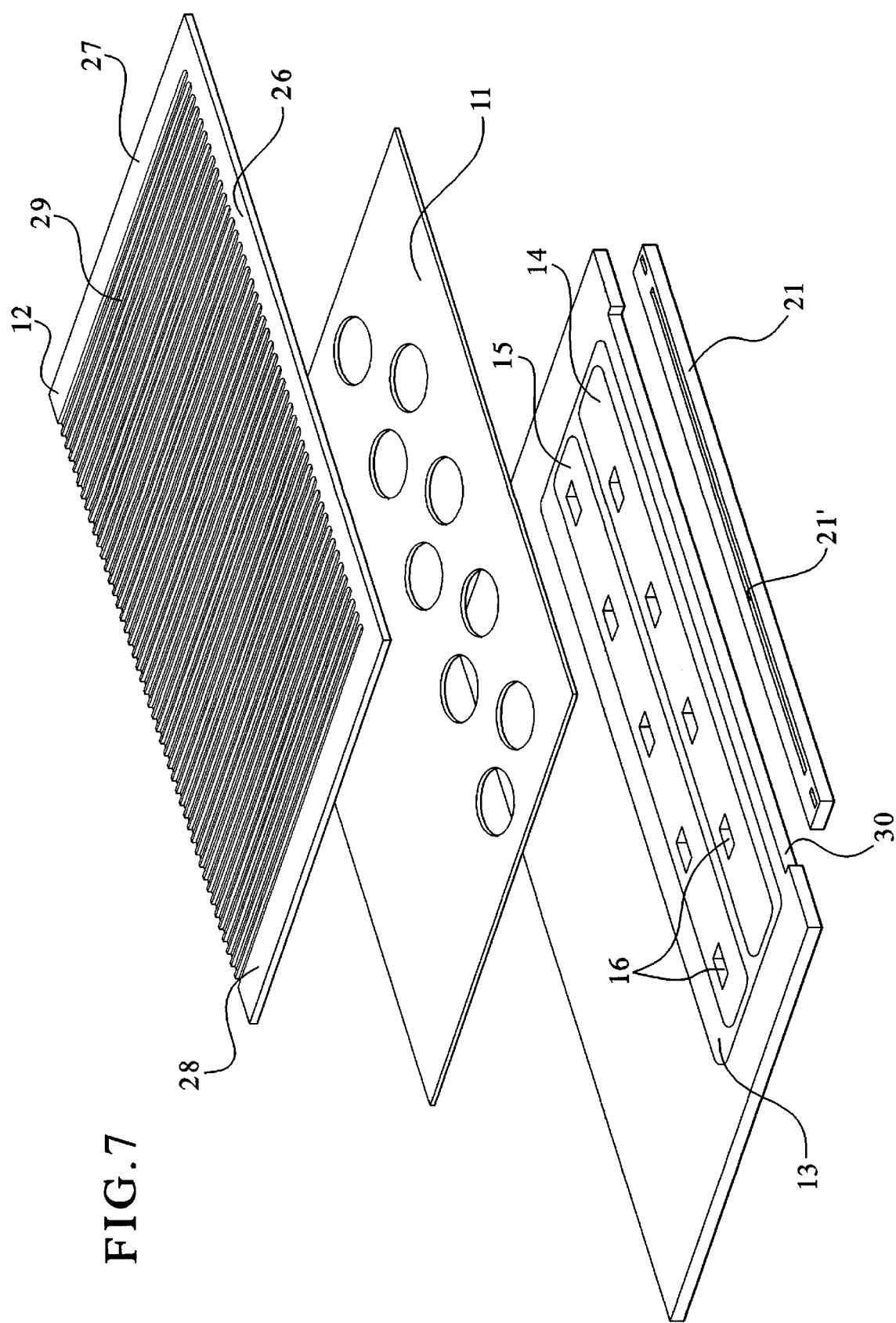
FIG. 7 is a perspective view of the ventilation plate, the shaping plate with nine holes and a receiver plate imbedded in a bottom plate of the shaping station with filling slots and the pressure reducing bar.

For further illustration, FIG. 7 shows an exploded view of the ventilation plate 12, the shaping plate 11, the receiver plate 13 with filling slots 16 and the pressure reducing bar 21. The ventilation plate 12 has a front end 26 and lateral sections 27 and 28 which are of solid construction. On the inside section of the ventilator plate 12, longitudinal grooves 29 are provided which are open at the rear, i.e., on the side opposite section 26. Alternatively, one or more recesses may be provided.

The pressure-reducing bar 21 is mounted in a suitable recess 30 formed at the front end of the receiver plate as seen in the exiting direction of the shaping plate 11. As illustrated by FIGS. 2 and 3, the front section 26 and the pressure-reducing bar 21 are disposed so as to be flush.

With an operation of 80 cycles per minute, for example, a nine-hole shaping plate achieves an increase in the output of more than 33% as compared to the previous shaping plates having one row of holes. With 90 cycles the increase in the output is at least 50%.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A device for producing ground meat patties of beef and/or pork, comprising:

a shaping plate which can be moved from a filling position in a shaping station into an ejection position outside the shaping station, the shaping plate having holes that are disposed offset relative to each other in moving direction in at least two rows, one behind the other;

a device by means of which ground meat can be supplied under pressure via a filling slot associated to each hole on the underside into the holes, said holes being covered at the top by means of a ventilation plate;

an antilipbar adjacent to the shaping station that includes a continuous longitudinal slit that fluidly communicates with and can reduce pressure from each hole in each row; and an ejection device disposed outside the shaping station above the ejection position of the shaping plate having ejection cups whose quantity and position is coordinated with the holes in the shaping plate.

2. The device according to claim 1, wherein the shaping plate has an uneven number of holes, and where the rear row has one more hole than the front row.

3. The device according to claim 1, wherein a distance between centerlines of the rows is smaller than a diameter of the a holes.

4. The device of claim 1, wherein the holes in the front row are centrally offset relative to those in the rear row.

5. The device of claim 1, wherein the filling slots have a right-angled cross section.

6. The device according to claim 1, wherein the filling slots have a rectangular cross section.

7. The device according to claim 1, wherein a lateral width of the filling slots is smaller than a space between the holes, and wherein a length of the filling slots is smaller than a diameter of the holes.

8. The device according to claim 1, wherein an arrangement of the filling slots is in registry with the holes.

9. The device according to claim 1, wherein the filling slots are provided in a common receiver plate.

10. The device according to claim 1, wherein the pressure-reducing bar is disposed below a solid portion of the ventilation plate.

11. The device according to claim 1, wherein the ventilation plate is stationary and includes groove-shaped ventilation openings running parallel to a direction of motion of the shaping plate.

12. The device according to claim 1, wherein the ground meat is delivered to the holes via a distribution chamber, the distribution chamber filled by a filling chamber that is filled alternately by at least two filling cylinders.

13. The device of claim 1, wherein the ground meat is delivered via a rotary slide valve.

14. A device for producing ground meat patties of beef and/or pork, comprising:

a shaping plate moveable from a filling position to an ejection position, the shaping plate having at least two offset rows of holes;

an apparatus that supplies ground meat under pressure via filling slots individually associated on one side of each hole, said holes being covered on the opposing side by a ventilation plate;

a pressure-reducing bar adjacent to the apparatus that includes a longitudinal slit that fluidly communicates with an entire area of at least one of the holes when the hole passes over the slit; and an ejection device disposed adjacent to the pressure reducing bar, which includes ejection cups that cooperate with the holes in the shaping plate.

15. The device of claim 14, which includes staggered rows of holes (24).

16. The device of claim 14, which includes a unique filling slot (16) associated with each hole (24).

17. The device of claim 14, which includes a ventilation plate disposed above the shaping plate.

* * * * *